United States Patent
Zhang et al.

(10) Patent No.: US 11,005,100 B2
(45) Date of Patent: *May 11, 2021

(54) SELENIUM-DOPED MXENE MATERIAL, AND PREPARATION METHOD AND USE THEREOF

(71) Applicant: WUYI UNIVERSITY, Guangdong (CN)

(72) Inventors: Yelong Zhang, Guangdong (CN); Xiaodan Xu, Guangdong (CN); Hongyang Sun, Guandong (CN); Hao Chen, Guangdong (CN); Da Wang, Guangdong (CN); Chi Zhang, Guangdong (CN); Weidong Song, Guangdong (CN); Yue Guo, Guangdong (CN); Zheng Liu, Guangdong (CN); Mei Chen, Guangdong (CN); Jinxiu Wen, Guangdong (CN); Qingguang Zeng, Guangdong (CN); Zhangquan Peng, Guangdong (CN)

(73) Assignee: WUYI UNIVERSITY, Jiangmen (CN)

(*) Notice: Subject to any disclaimer, the term of this patent is extended or adjusted under 35 U.S.C. 154(b) by 13 days.

This patent is subject to a terminal disclaimer.

(21) Appl. No.: 16/530,378

(22) Filed: Aug. 2, 2019

(65) Prior Publication Data
US 2020/0227744 A1 Jul. 16, 2020

(30) Foreign Application Priority Data
Jan. 15, 2019 (CN) .......................... 201910037241.6

(51) Int. Cl.
*H01M 4/58* (2010.01)
*H01M 10/054* (2010.01)
*H01M 4/02* (2006.01)

(52) U.S. Cl.
CPC .......... *H01M 4/58* (2013.01); *H01M 10/054* (2013.01); *H01M 2004/028* (2013.01)

(58) Field of Classification Search
CPC ........................... H01L 31/0224; B01D 69/12
See application file for complete search history.

(56) References Cited

FOREIGN PATENT DOCUMENTS

JP 107200318 A * 9/2017 ........... C01B 21/064

* cited by examiner

*Primary Examiner* — Khanh T Nguyen
(74) *Attorney, Agent, or Firm* — McNees Wallace & Nurick LLC

(57) ABSTRACT

The present invention discloses a selenium-doped MXene material and a preparation method thereof, comprising the following steps: (1) adding MXene and an organic selenium source into a dispersant, and stirring to prepare a dispersion with a concentration of 10 mg/ml to 100 mg/ml, wherein a mass ratio of MXene and an organic selenium source is 0.1 to 1:1; (2) transferring the dispersion into a reaction kettle, heating to 110° C. to 230° C., reacting for 10 h to 30 h, and then naturally cooling to a room temperature; and (3) washing the product obtained in the step (2) with a cleaning agent, centrifuging to collect a precipitate, and drying the precipitate under vacuum to obtain the selenium-doped MXene material. The composite material prepared by the present invention has high specific surface area, good electrical conductivity, cycle stability performance, rate performance and high theoretical specific capacity.

12 Claims, 6 Drawing Sheets

SELENIUM-DOPED MXENE MATERIAL, AND PREPARATION METHOD AND USE THEREOF

FIELD OF THE INVENTION

The present invention belongs to the field of nano-material technologies, and relates to a selenium-doped MXene material, and a preparation method and use thereof, and more particularly, to a use as an electrode material in a potassium ion battery.

BACKGROUND OF THE INVENTION

With the increasing demand for energy in modern society, fossil energy is continuously consumed and exhausted, and an ecological environment problem is becoming increasingly serious. Therefore, the development of new green energy has become a research focus.

At present, a lithium ion battery has been widely used in people's daily life, and the large consumption of metal lithium has also been concerned by people. Therefore, to seek a substitute for the lithium ion battery has become a current research focus.

Potassium resources are abundant on the earth, accounting for 2.09% of the earth's crust, and are more than 1,000 times as much as lithium resources (0.0017%), and the price of the potassium resources is relatively low. Due to the advantages of low cost, long cycle life, high energy density and good rate performance, the potassium ion battery can meet the requirements of the energy storage field, and is a potential secondary battery. Based on the advantages above, the potassium ion secondary battery technology is deemed as a promising large-scale electrochemical energy storage technology in the future. Therefore, the development of the potassium ion battery with low price and good cycle performance has great commercial value.

Since a radius of a potassium ion is larger than that of a lithium ion, a graphite carbon cathode material reaching commercial application in the lithium ion battery cannot meet the rapid deintercalation of the potassium ion due to a small layer spacing (0.335 nm), so that seeking a negative electrode material of the potassium ion battery with high capacity and excellent cycle performance is a research focus in this field.

However, in the current battery industry, there are many methods or process steps for preparing potassium batteries, which is easy to increase the cost; if some process steps are simply omitted, the performance of potassium batteries will be reduced. In addition, $H_2S$ is used as a sulfur source in a widely used sulfur-doped MXene technology, which has high toxicity and high pollution, and is difficult to process subsequently. Therefore, it is of great practical significance to prepare the selenium-doped MXene material and the potassium ion battery with low cost, safety and environmental protection through a simple method.

SUMMARY OF THE INVENTION

In view of the problems in the prior art, one object of the present invention is to provide a selenium-doped MXene material. Another object of the present invention is to provide a preparation method of a selenium-doped MXene material mentioned above. Further, the present invention provides an application of the selenium-doped MXene material to use the selenium-doped MXene material in a cathode of a potassium ion battery.

The present invention employs the following technical solutions.

A preparation method of a selenium-doped MXene material, the method is a solvothermal method and comprises the following steps:

(1) adding MXene and an organic selenium source into a dispersant, stirring (magnetically stirring optionally) to prepare a dispersion with a concentration of 10 mg/ml to 100 mg/ml, optionally a concentration of 20 mg/ml to 80 mg/ml, and optionally a concentration of 40 mg/ml to 60 mg/ml, wherein a mass ratio of MXene and an organic selenium source is (0.1-1):1, optionally (0.2-0.8):1 and optionally (0.4-0.6):1;

(2) transferring the dispersion into a reaction kettle, heating to 110° C. to 230° C., reacting for 10 h to 30 h, wherein the reaction is preferably performed in the reaction kettle (the reaction kettle is sealed), and then naturally cooling to a room temperature; and (3) washing the product obtained in the step (2) with a cleaning agent, then centrifuging to collect a precipitate, and drying the precipitate under vacuum for 8 h to 24 h, for example, 16 h, to obtain the selenium-doped MXene material.

Further, the organic selenium source is at least one selected from the group consisting of dimethyl selenide, dibenzyl diselenide and phenylselenol, preferably dimethyl selenide or phenylselenol, and preferably dimethyl selenide and dibenzyl diselenide with a mass ratio of 3 to 5:1.

Further, the MXene is one or more selected from the group consisting of $Ti_2NT_x$, $Mo_2NT_x$, $V_2NT_x$, $Ti_2CT_x$, $Mo_2CT_x$ and $V_2CT_x$, optionally $V_2CT_x$, optionally $Mo_2NT_x$, optionally $V_2NT_x$, and optionally $Ti_2CT_x$ and $V_2NT_x$ with a mass ratio of 4 to 6:1, optionally $Ti_2CT_x$ and $Mo_2CT_x$ with a mass ratio of 4 to 6:1, and optionally $Ti_2CT_x$, $Mo_2CT_x$ and $V_2CT_x$ (e.g., a mass ratio of 5-8:2:1), wherein $T_x$ is a surface functional group, such as —O, —F or —OH.

Further, the dispersant is at least one selected from the group consisting of N,N-dimethylformamide and ethanol.

Further, the cleaning agent is at least one selected from the group consisting of water and ethanol. Preferably, the precipitate is thoroughly washed with deionized water and absolute ethyl alcohol, and the precipitate can be alternately washed with deionized water and absolute ethyl alcohol for 2 to 15 times, and preferably 3 to 8 times.

Further, a selenium doping amount in the selenium doped MXene material is 0.3 to 8 wt % (for example, 1 wt %, 2 wt %, 3 wt %, 4 wt %, 5 wt %, 6 wt %, 7 wt % and 8 wt %).

Further, a stirring time in the step (1) is 1 h to 6 h, and optionally 2 h, 3 h, 4 h, 5 h, and 6 h.

Further, the dispersion is heated to 110° C. to 200° C., preferably 130° C. to 180° C., and optionally 140° C., 150° C., 160° C. and 170° C., and reacted for 12 h to 30 h, and optionally 13 h, 14 h, 15 h, 16 h, 17 h, 18 h, 19 h, 20 h, 21 h, 22 h, 23 h, 24 h, 25 h, 26 h, 27 h and 28 h in the reaction kettle in the step (2).

Further, a rotation speed used for the centrifugation in the step (3) is 4000 rpm to 6000 rpm, and preferably 5000 rpm.

Further, a temperature of drying under vacuum is 50° C. to 70° C., and preferably 60° C., and a vacuum degree does not exceed 133 Pa, for example, the vacuum degree does not exceed 130 Pa, 120 Pa, 110 Pa, 100 Pa and 90 Pa.

There is also provided a selenium doped MXene material prepared by the preparation method of a selenium-doped MXene material.

There is also provided a use of the selenium-doped MXene material, wherein the selenium-doped MXene material is used in a cathode of a potassium ion battery.

MXene is a novel two-dimensional layered crystal of transition metal carbide or carbonitride, which has a structure similar to graphene. MXene materials have good electrical conductivity, high specific surface area, low ion diffusion resistance, low open circuit voltage and high storage capacity, and can better combine a battery behavior with a pseudocapacitance behavior to further increase the capacity. After being doped with selenium, some C and N atoms in the MXene are replaced by Se atoms, and the surface of the MXene has a large number of defects, which further improves the specific capacity, rate performance, cycle stability, etc., and is more suitable to be used in a cathode material of a potassium ion battery.

The present invention has the following beneficial effects:

(1) the composite material prepared by the present invention has high specific surface area, good electrical conductivity, cycle stability performance, rate performance and high theoretical specific capacity, and is simple in preparation and has a low cost, and is suitable for large-scale development and application of potassium ion batteries; and (2) the present invention has mature preparation apparatus, simple process, easily available raw materials and high production efficiency, and is convenient for large-scale industrial production and application.

DETAILED DESCRIPTION OF THE INVENTION

In order to better explain the present invention, the present invention will be further described with reference to the following specific embodiments, but the present invention is not limited to the specific embodiments.

Embodiment 1

A preparation method of a selenium-doped MXene material, wherein a MXene material and dimethyl selenide were prepared into a selenium-doped MXene material according to a mass ratio of 0.1:1, comprised the following steps:

(1) 50 mg MXene material ($Ti_2CT_x$) and 500 mg dimethyl selenide were added into N,N-dimethylformamide to prepare 10 mg/ml dispersion, and the dispersion was magnetically stirred at a room temperature for 1 h;

(2) the dispersion obtained in the step (1) was transferred into a 100 ml reaction kettle, placed in an oven to react at 110° C. for 12 h, and naturally cooled to a room temperature;

(3) the product obtained in the step (2) was collected, thoroughly cleaned with deionized water and anhydrous ethanol, centrifuged, and then dried under vacuum at 60° C. for 8 h to obtain the selenium-doped MXene material; and (4) preparation of a cathode of a potassium ion battery: the selenium-doped MXene material obtained in the step (3) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced to obtain a cathode sheet of a potassium ion battery.

Figure 1:
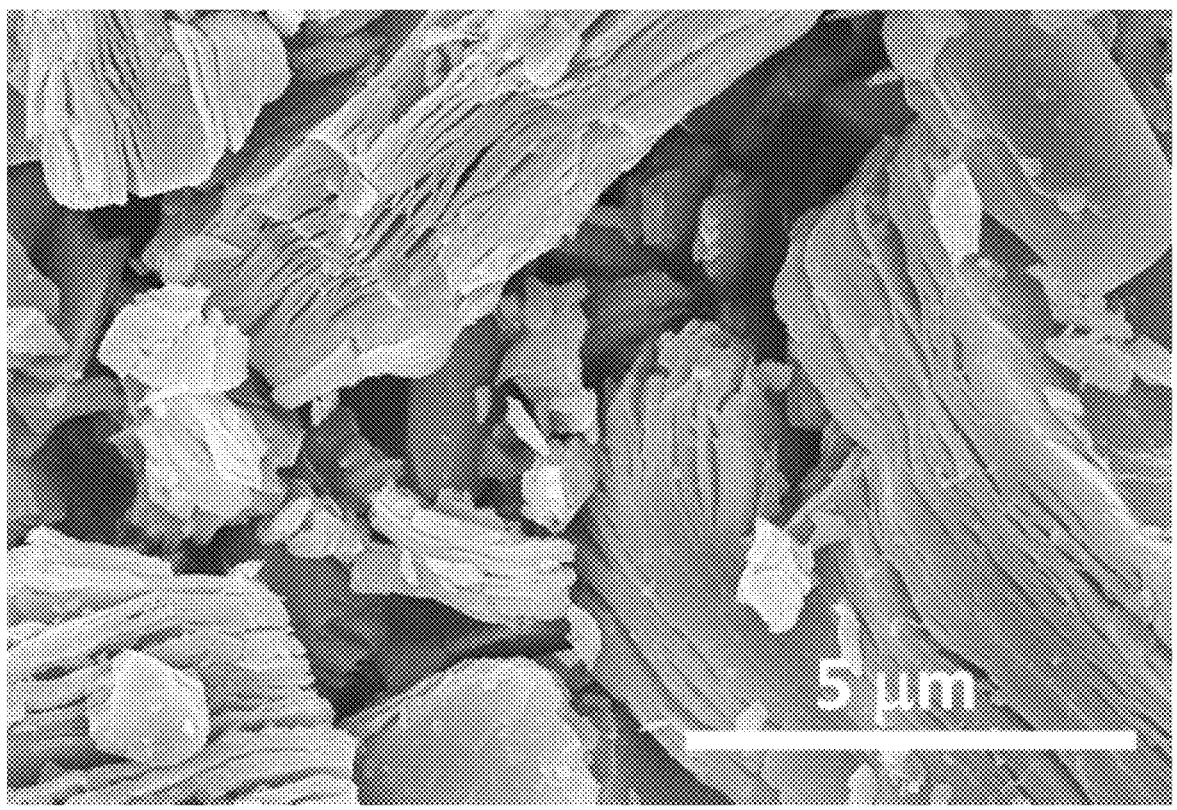
FIG. 1 is a scanning electron micrograph of an undoped MXene material in Comparative Example 1.
Figure 2:
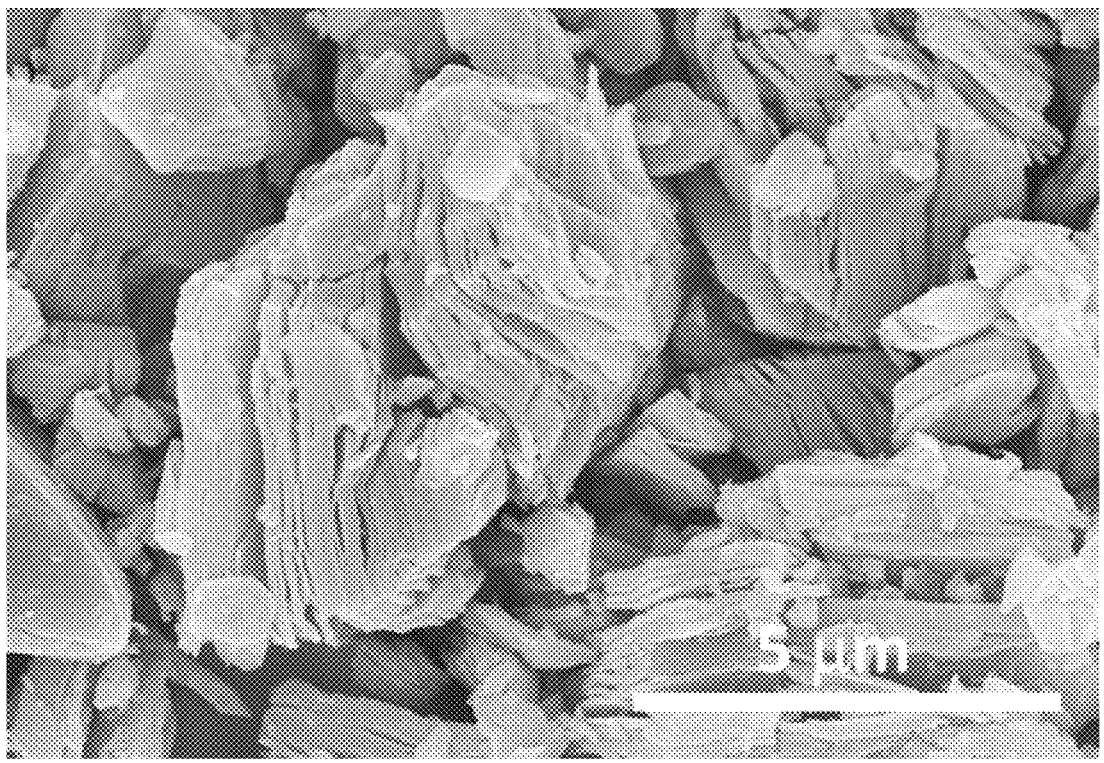
FIG. 2 is a scanning electron micrograph of a selenium-doped MXene material in Embodiment 1.
Figure 3:
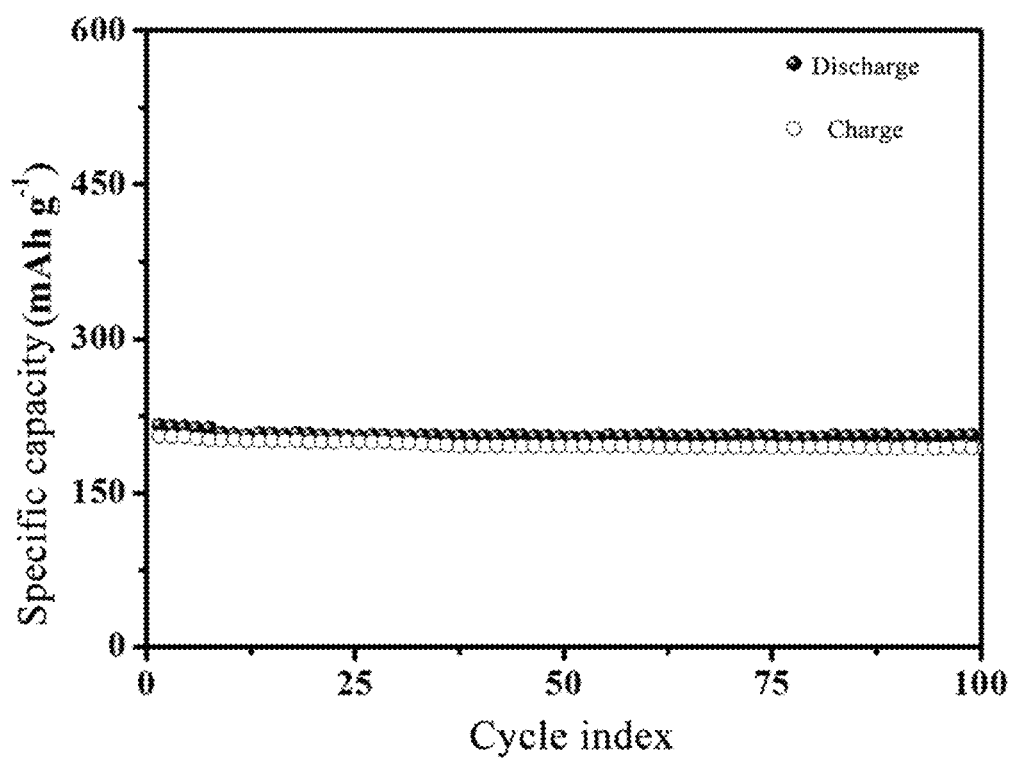
FIG. 3 is a cycle performance chart of a cathode of a selenium-doped MXene potassium ion battery in Embodiment 1.
Figure 4:
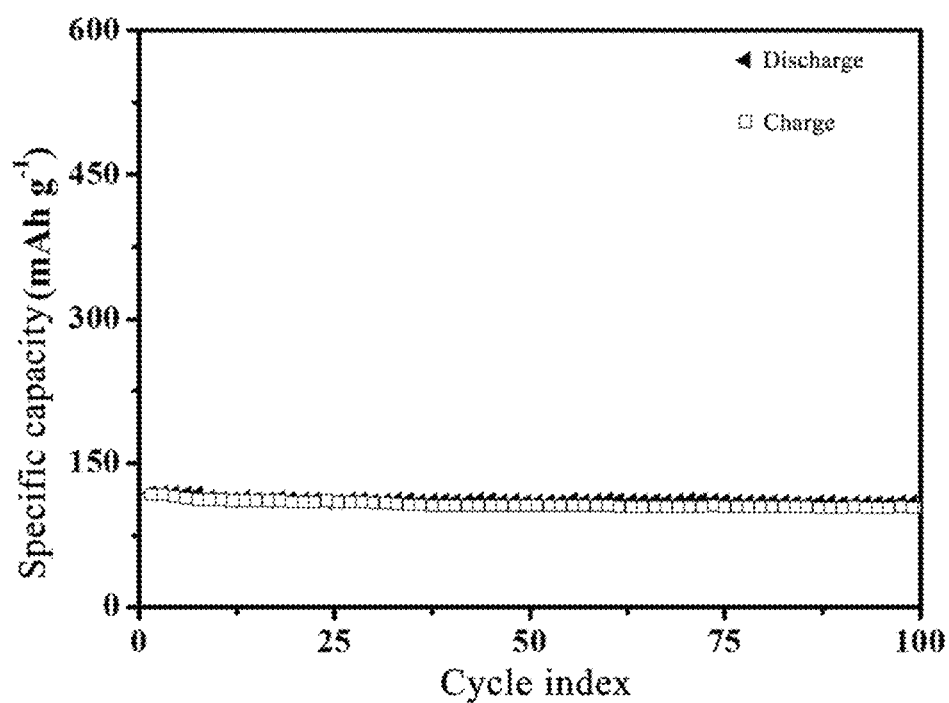
FIG. 4 is a cycle performance chart of a cathode of an undoped MXene potassium ion battery in Comparative Example 1.

The doped MXene in this embodiment had a specific surface area of 210.2 $m^2/g$, an interlamellar spacing of 0.72 nm, and a selenium atom content of 0.3%, which were much larger than a specific surface area (50.8 $m^2/g$) and an interlamellar spacing (0.60 nm) of the undoped Mxene. At a current density of 100 mA/g, a reversible capacity of a cathode of a selenium-doped MXene potassium ion battery shown in FIG. 3 after 100 cycles was 215 mAh/g, which was 1.85 times that of a cathode of an undoped MXene potassium ion battery shown in FIG. 4 (116.3 mAh/g), and the doped MXene material in this embodiment had a very stable charge-discharge cycle characteristic.

Embodiment 2

A preparation method of a selenium-doped MXene material, wherein a MXene material and dimethyl selenide were prepared into a selenium-doped MXene material according to a mass ratio of 0.5:1, comprised the following steps:

(1) 500 mg MXene material ($Ti_2CT_x$) and 1000 mg dimethyl selenide were added into N,N-dimethylformamide to prepare 50 mg/ml dispersion, and the dispersion was magnetically stirred at a room temperature for 3 h;

(2) the dispersion obtained in the step (1) was transferred into a 50 ml reaction kettle, placed in an oven to react at 180° C. for 18 h, and naturally cooled to a room temperature;

(3) the product obtained in the step (2) was collected, thoroughly cleaned with deionized water and anhydrous ethanol, centrifuged, and then dried under vacuum at 60° C. for 16 h to obtain the selenium-doped MXene material; and (4) preparation of a cathode of a potassium ion battery: the selenium-doped MXene material obtained in the step (3) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced to obtain a cathode sheet of a potassium ion battery.

Figure 5:
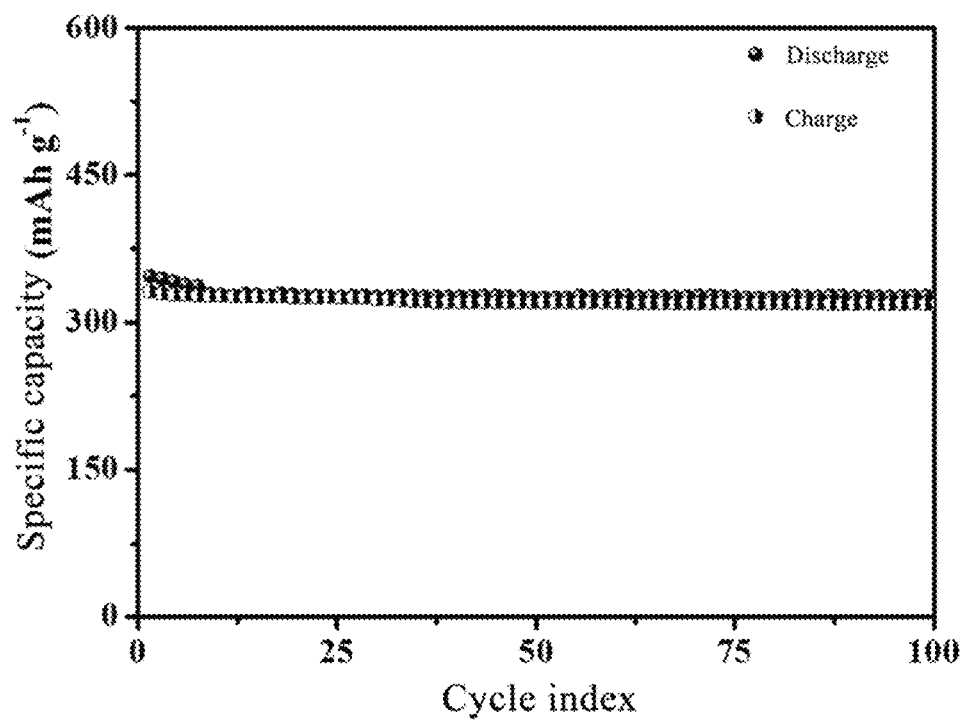
FIG. 5 is a cycle performance chart of a cathode of a selenium-doped MXene potassium ion battery in Embodiment 2.

The doped MXene in this embodiment had a specific surface area of 350.5 $m^2/g$, an interlamellar spacing of 0.76 nm, and a selenium atom content of 0.5%, which were much larger than the specific surface area (50.8 $m^2/g$) and the interlamellar spacing (0.60 nm) of the undoped Mxene. At a current density of 100 mA/g, a reversible capacity of a cathode of a selenium-doped MXene potassium ion battery shown in FIG. 5 after 100 cycles was 341 mAh/g, which was 2.7 times that of the cathode of the undoped MXene potassium ion battery (116.3 mAh/g), and the doped MXene material in this embodiment had a very stable charge-discharge cycle characteristic.

Embodiment 3

A preparation method of a selenium-doped MXene material, wherein a MXene material and dimethyl selenide were prepared into a selenium-doped MXene material according to a mass ratio of 1:1, comprised the following steps:
(1) 1500 mg MXene material ($Ti_2CT_x$) and 1500 mg dimethyl selenide were added into N,N-dimethylformamide to prepare 100 mg/ml dispersion, and the dispersion was magnetically stirred at a room temperature for 6 h;
(2) the dispersion obtained in the step (1) was transferred into a 50 ml reaction kettle, placed in an oven to react at 230° C. for 30 h, and naturally cooled to a room temperature;
(3) the product obtained in the step (2) was collected, thoroughly cleaned with deionized water and anhydrous ethanol, centrifuged, and then dried under vacuum at 60° C. for 24 h to obtain the selenium-doped MXene material; and
(4) preparation of a cathode of a potassium ion battery: the selenium-doped MXene material obtained in the step (3) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced to obtain a cathode sheet of a potassium ion battery.

Figure 6:
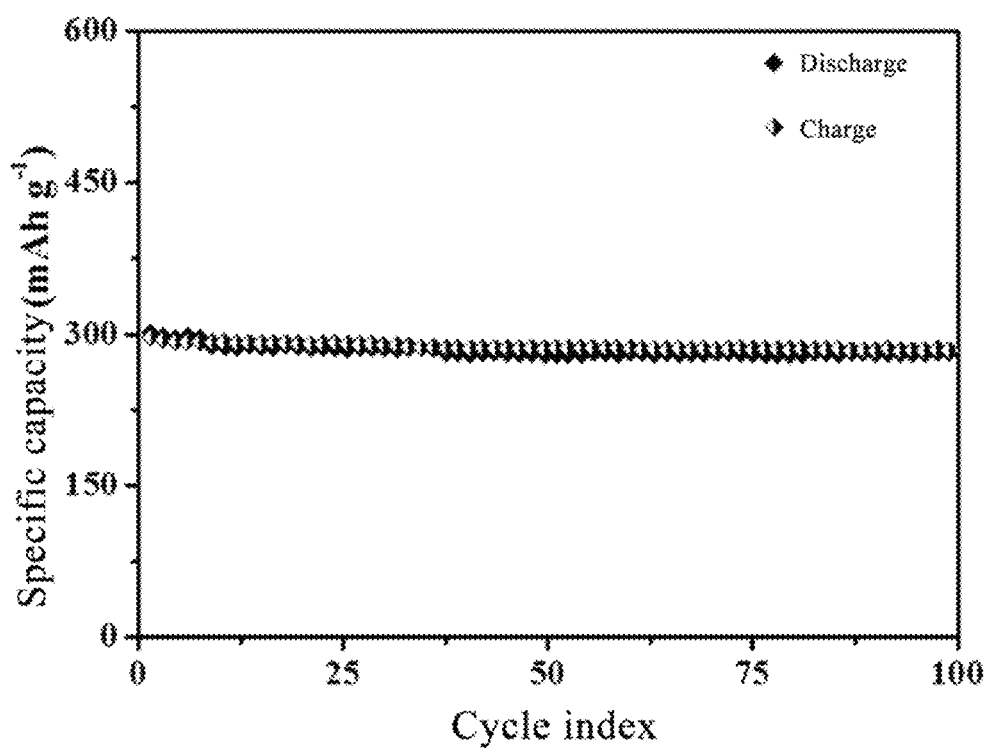
FIG. 6 is a cycle performance chart of a cathode of a selenium-doped MXene potassium ion battery in Embodiment 3.

The doped MXene in this embodiment had a specific surface area of 301.7 $m^2/g$, an interlamellar spacing of 0.79 nm, and a selenium atom content of 8%, which were much larger than the specific surface area (50.8 $m^2/g$) and the interlamellar spacing (0.60 nm) of the undoped Mxene. At a current density of 100 mA/g, a reversible capacity of a cathode of a selenium-doped MXene potassium ion battery shown in FIG. 6 after 100 cycles was 300 mAh/g, which was 2.6 times that of the cathode of the undoped MXene potassium ion battery (116.3 mAh/g), and the doped MXene material in this embodiment had a very stable charge-discharge cycle characteristic.

Embodiment 4

A preparation method of a selenium-doped MXene material, wherein a MXene material and an organic selenium source were prepared into a selenium-doped MXene material according to a mass ratio of 0.4:1, comprised the following steps:
(1) 400 mg MXene material ($V_2CT_x$) and 1000 mg organic selenium source (800 mg dimethyl selenide and 200 mg dibenzyl diselenide) were added into N,N-dimethylformamide to prepare 40 mg/ml dispersion, and the dispersion was magnetically stirred at a room temperature for 3 h;
(2) the dispersion obtained in the step (1) was transferred into a 50 ml reaction kettle, placed in an oven to react at 190° C. for 10 h, and naturally cooled to a room temperature;
(3) the product obtained in the step (2) was collected, thoroughly cleaned with deionized water and anhydrous ethanol, centrifuged, and then dried under vacuum at 60° C. for 16 h to finally obtain the selenium-doped MXene material; and
(4) preparation of a cathode of a potassium ion battery: the selenium-doped MXene material obtained in the step (3) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced to obtain a cathode sheet of a potassium ion battery.

At a current density of 100 mA/g, a reversible capacity of the cathode of the doped MXene potassium ion battery in this embodiment after 100 cycles was 401 mAh/g, which was 3.5 times that of the cathode of the undoped MXene potassium ion battery (116.3 mAh/g), and the doped MXene material in this embodiment had a very stable charge-discharge cycle characteristic.

Embodiment 5

A preparation method of a selenium-doped MXene material, wherein a MXene material and dimethyl selenide were prepared into a selenium-doped MXene material according to a mass ratio of 0.6:1, comprised the following steps:
(1) 600 mg MXene material (500 mg $Ti_2CT_x$ and 100 mg $Mo_2CT_x$) and 1000 mg dimethyl selenide were added into N,N-dimethylformamide to prepare 60 mg/ml dispersion, and the dispersion was magnetically stirred at a room temperature for 3 h;
(2) the dispersion obtained in the step (1) was transferred into a 50 ml reaction kettle, placed in an oven to react at 170° C. for 13 h, and naturally cooled to a room temperature;
(3) the product obtained in the step (2) was collected, thoroughly cleaned with deionized water and anhydrous ethanol, centrifuged, and then dried under vacuum at 60° C. for 16 h to obtain the selenium-doped MXene material; and
(4) preparation of a cathode of a potassium ion battery: the selenium-doped MXene obtained in the step (3) was mixed with a polyvinylidene fluoride binder and carbon black according to a mass ratio of 8:1:1, a proper amount of N-methyl pyrrolidone solution was added, stirred and dispersed, a slurry was formed after uniformly stirring and was coated on a current collector, and dried under vacuum and sliced to obtain a cathode sheet of a potassium ion battery.

At a current density of 100 mA/g, a reversible capacity of the cathode of the doped MXene potassium ion battery in this embodiment after 100 cycles was 387 mAh/g, which was 3.3 times that of the cathode of the undoped MXene potassium ion battery (116.3 mAh/g), and the doped MXene material in this embodiment had a very stable charge-discharge cycle characteristic.

Comparative Example 1: undoped MXene is used as a cathode of an potassium ion battery.

Comparative Example 2: an inorganic selenium source (e.g., selenium powder)-doped MXene is used as a cathode of potassium ion battery, wherein a doping process was the same as that in the Embodiment 2.

TABLE 1

| | | Performance test | | | |
|---|---|---|---|---|---|
| | | Specific surface area (m$^2$/g) | Interlamellar spacing (nm) | Mass fraction of selenium atom content(%) | Stable capacity after 100 cycles (mAh/g) |
| Comparative Example 1 | Undoped MXene | 50.8 | 0.60 | 0 | 116.3 |
| Embodiment 1 | Selenium-doped MXene | 210.2 | 0.72 | 0.3 | 215 |
| Comparative Example 2 | Inorganic selenium source-doped MXene | 142.3 | 0.63 | 0.2 | 172 |
| Embodiment 2 | Selenium-doped MXene | 350.5 | 0.76 | 5 | 341 |
| Embodiment 3 | Selenium-doped MXene | 301.7 | 0.79 | 8 | 300 |
| Embodiment 4 | Selenium-doped MXene | 403.2 | 0.75 | 4 | 401 |
| Embodiment 5 | Selenium-doped MXene | 389.8 | 0.77 | 6 | 387 |

The foregoing descriptions are merely specific embodiments of the present invention, but are not intended to limit the protection scope of the present invention. All equivalent transformations made using the description of the present invention, or being used directly or indirectly in other related technical fields, are similarly included in the protection scope of the present invention.

What is claimed is:

1. A preparation method of a selenium-doped MXene material, comprising the following steps:
   (1) adding MXene and an organic selenium source into a dispersant, and stirring to prepare a dispersion with a concentration of 10 mg/ml to 100 mg/ml, wherein a mass ratio of MXene and the organic selenium source is 0.1 to 1:1, wherein the dispersion concentration is the concentration of MXene and the organic selenium source;
   (2) transferring the dispersion into a reaction kettle, heating to 110° C. to 230° C., reacting for 10 h to 30 h, and then naturally cooling to a room temperature; and
   (3) washing the product obtained in the step (2) with a cleaning agent, centrifuging to collect a precipitate, and drying the precipitate under vacuum for 8 h to 24 h to obtain the selenium-doped MXene material.

2. The preparation method of a selenium-doped MXene material according to claim 1, wherein the organic selenium source is at least one selected from the group consisting dimethyl of dimethyl selenide, dibenzyl diselenide and phenylselenol.

3. The preparation method of a selenium-doped MXene material according to claim 1, wherein the MXene is one or more selected from the group consisting of $Ti_2NT_x$, $Mo_2NT_x$, $V_2NT_x$, $Ti_2CT_x$, $Mo_2CT_x$ and $V_2CT_x$.

4. The preparation method of a selenium-doped MXene material according to claim 1, wherein the dispersant is at least one selected from the group consisting of N,N-dimethylformamide and ethanol.

5. The preparation method of a selenium-doped MXene material according to claim 1, wherein the cleaning agent is at least one selected from the group consisting of water and ethanol.

6. The preparation method of a selenium-doped MXene material according to claim 1, wherein a selenium doping amount in the selenium-doped MXene material is 0.3 wt to 8 wt %.

7. The preparation method of a selenium-doped MXene material according to claim 1, wherein a stirring time in the step (1) is 1 h to 6 h.

8. The preparation method of a selenium-doped MXene material according to claim 1, wherein the dispersion is heated to 110° C. to 200° C. and reacted for 12 h to 30 h in the reaction kettle in the step (2).

9. The preparation method of a selenium-doped MXene material according to claim 1, wherein a rotation speed used for the centrifugation in the step (3) is 4000 rpm to 6000 rpm.

10. The preparation method of a selenium-doped MXene material according to claim 1, wherein a temperature of drying under vacuum is 50° C. to 70° C., and a vacuum degree does not exceed 133 Pa.

11. A selenium-doped MXene material, wherein the selenium-doped MXene material is prepared by the preparation method according to claim 1.

12. A method for making a potassium ion battery comprising: forming a cathode for the potassium ion battery, the cathode comprising the selenium-doped MXene material according to claim 11.

* * * * *